United States Patent
Honda et al.

(10) Patent No.: US 11,767,065 B2
(45) Date of Patent: Sep. 26, 2023

(54) SWEPT CROSSMEMBER FOR VEHICLE FLOOR

(71) Applicant: Shape Corp., Grand Haven, MI (US)

(72) Inventors: Tomohisa Honda, Aichi (JP); Kazutoyo Fujikawa, Kanagawa (JP)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 17/657,555

(22) Filed: Mar. 31, 2022

(65) Prior Publication Data

US 2022/0315117 A1  Oct. 6, 2022

Related U.S. Application Data (60) Provisional application No. 63/230,216, filed on Aug. 6, 2021, provisional application No. 63/168,851, filed on Mar. 31, 2021.

(51) Int. Cl.
| | |
|---|---|
| *B62D 25/20* | (2006.01) |
| *B62D 27/02* | (2006.01) |
| *B62D 25/02* | (2006.01) |
| *B62D 29/00* | (2006.01) |

(52) U.S. Cl.
CPC ........... *B62D 25/20* (2013.01); *B62D 25/025* (2013.01); *B62D 27/02* (2013.01); *B62D 29/007* (2013.01)

(58) Field of Classification Search
CPC ........ B62D 25/20; B62D 25/025; B60K 1/04; B60K 1/0438
USPC ... 296/23.01, 3, 204, 193.07, 187.12, 29, 30
See application file for complete search history.

(56) References Cited

U.S. PATENT DOCUMENTS

| | | | | |
|---|---|---|---|---|
| 7,014,256 | B2 * | 3/2006 | Kamura | B62D 25/20 296/193.07 |
| 8,454,079 | B2 * | 6/2013 | Yoshida | B21D 7/08 296/203.02 |
| 8,991,905 | B2 * | 3/2015 | Mochizuki | B62D 25/20 296/29 |
| 10,618,570 | B2 * | 4/2020 | Kageyama | B62D 25/20 |
| 2004/0130166 | A1 | 7/2004 | Trancart et al. | |
| 2019/0176901 | A1 | 6/2019 | Cheon | |
| 2019/0275874 | A1 | 9/2019 | Fukui | |

FOREIGN PATENT DOCUMENTS

| | | |
|---|---|---|
| DE | 102012022934 A1 | 5/2013 |
| EP | 1378402 A1 | 1/2004 |
| JP | 2007083908 A | 4/2007 |

OTHER PUBLICATIONS

International Search Report & Written Opinion for PCT/US2022/071478, dated Aug. 1, 2022; 13 pp.

* cited by examiner

*Primary Examiner* — Dennis H Pedder
(74) *Attorney, Agent, or Firm* — Bodman PLC (57) ABSTRACT

A vehicle floor assembly having a floor panel and a pair of elongated members disposed along opposing sides of the floor panel. A central tunnel extends longitudinally between the pair of elongated members and has an upper surface elevated vertically from a planar extent of the floor panel. A crossmember beam is coupled to and spans between the pair of longitudinal members. The crossmember beam has a cross-sectional shape extending continuously along a length of the crossmember beam. The crossmember beam includes a curved shape along at least a section of the length of the crossmember beam that positions a lower surface of the crossmember beam above the upper surface of the central tunnel.

20 Claims, 10 Drawing Sheets

SWEPT CROSSMEMBER FOR VEHICLE FLOOR

CROSS-REFERENCE TO RELATED APPLICATIONS

This application claims benefit and priority under 35 U.S.C. § 119(e) of U.S. provisional application Ser. No. 63/168,851, filed Mar. 31, 2021, and U.S. provisional application Ser. No. 63/230,216, filed Aug. 6, 2021, the contents of which are hereby incorporated herein by reference in their entireties.

TECHNICAL FIELD

The present disclosure relates to floor structures and beams for vehicles, and more particularly to crossmember structures and related floor assemblies, sub-assemblies, and the like.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at the rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact intrusion distance to be reduced in order to maximize available battery storage volume in the battery trays. For example, it is generally known to increase stiffness of a rocker section to reduce the inboard distance of a side impact intrusion. However, increasing stiffness of a rocker section often involves adding internal reinforcements to the rocker section that can undesirably add mass, complexity, and expense.

SUMMARY

One aspect of the disclosure provides a floor assembly for a vehicle that includes a crossmember that is at least partially swept or curved upward to span over an obstruction on the floor assembly, such as a tunnel member or the like. The vehicle floor assembly includes a floor panel and a pair of longitudinal members disposed longitudinally along sides of the floor panel. The floor assembly also includes a central tunnel that extends longitudinally along the floor panel between the longitudinal members. The crossmember couples to and spans between the pair of longitudinal member. The crossmember has a cross-sectional shape extending continuously along the length of the crossmember, such a roll formed beam or the like. The crossmember includes a swept shape along at least a section of the length so as to elevate a central section of the crossmember relative to the central tunnel, such that the crossmember spans over the central tunnel. Upon a lateral impact, the crossmember may provide a lateral load path between the longitudinal members for transmitting laterally inboard impact forces over the central tunnel.

Implementations of the disclosure may include one or more of the following optional features. In some implementations, a pair of mounting brackets may be attached between opposing ends of the tubular beam and inboard surfaces of the pair of longitudinal members. In some examples, a central mounting bracket may be disposed over the central section of the tubular beam and coupled to the central tunnel.

In some implementations, the crossmember is a beam is formed from a metal sheet that is bent or otherwise deformed to have at least one closed tubular section extending along the length of the beam. In some examples, the beam has a pair of adjacent tubular members that have hollow openings that are divided by a common center wall of the beam. In some instances, the pair of adjacent tubular members are disposed laterally adjacent to each when spanning across the vehicle floor. The metal sheet may a martensitic steel with a tensile strength of at least 980 MPa, such as at least 1,500 MPa.

In some implementations, a bottom surface of the crossmember is elevated at the central section a clearance distance relative to the opposing ends of the crossmember. The clearance distance, in some examples, is at least a half of a vertical thickness of the tubular beam that is configured to span over the central tunnel.

In some examples, the floor assembly may also include a second crossmember that is coupled to and spans between the pair of longitudinal member at a longitudinally spaced distance from the first crossmember. In some instances, the second crossmember may include a beam with a second swept shape along at least a section of the length, where the second swept shape has a smaller radius of curvature than the first swept shape to curve over the central tunnel at a greater vertical clearance distance.

Another aspect of the disclosure provides a swept crossmember for a vehicle floor that includes a tubular beam having a cross-sectional shape extending continuously along a length of the tubular beam. The tubular beam is curved upward along the length to define a swept shape. A pair of mounting brackets are coupled to opposing ends of the tubular beam that are configured to mount at longitudinal members that span along sides of the vehicle floor. In some examples the tubular beam is configured to extend laterally across the vehicle floor to define a lateral load path between the longitudinal members.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
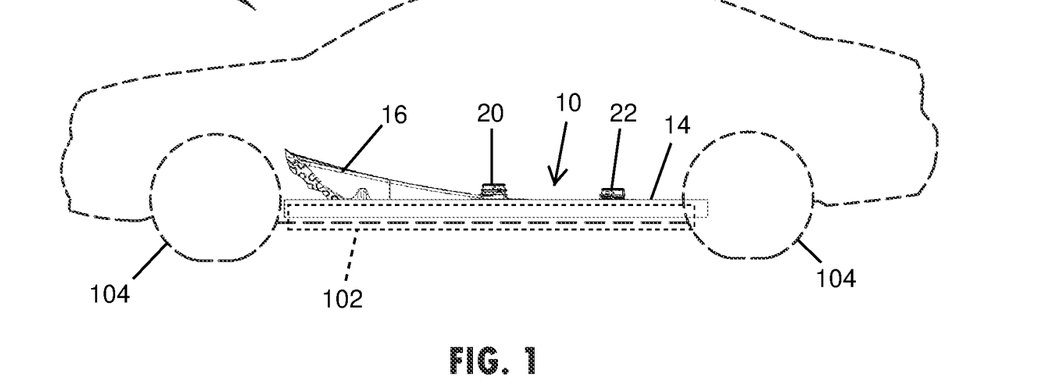
FIG. 1 is a side elevation view of a vehicle showing a floor assembly.
Figure 2:
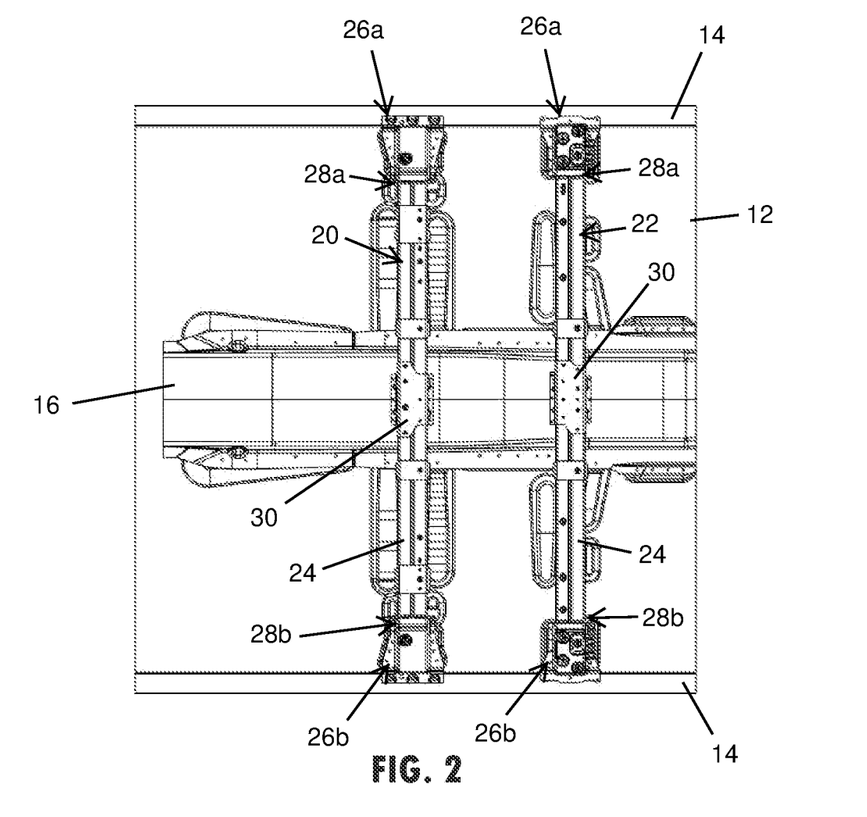
FIG. 2 is a top plan view of the floor assembly.

Referring now to the drawings and the illustrative examples depicted therein, a floor assembly 10 for a vehicle 100, such as shown in FIG. 1, has a floor panel 12 and a pair of longitudinal members 14 disposed longitudinally along sides of the floor panel 12. The floor assembly 10 or vehicle structure may also include a central tunnel 16 that extends longitudinally along and protrudes upward from the floor panel 12 between the longitudinal members 14. In additional examples, the central tunnel may be omitted or otherwise replaced with another structure, such as a portion of a battery tray or module. The central tunnel commonly houses or partially encloses vehicle drive train and exhaust system components, such as a drive shaft or exhaust pipe or the like. It is also contemplated that the central tunnel may house or partially enclose wire harnesses, coolant lines, or electrical components, such as those related to electrical controls and systems for an electric vehicle. Further, the central tunnel may be a structural component that at least partially stiffens the floor and transmits longitudinal impact loads, such as when rocker structures are reduced in size or strength for assistance with increasing battery capacity in trays disposed across the width of the vehicle.

As further shown in the example provided in FIG. 1, the vehicle 100 may optionally include a battery tray 102 mounted inboard from the outer sills and below the floor panel 12 of the floor assembly 10. The battery tray 102 encloses a battery or batteries that are at least partially used to operate a propulsion system of the vehicle 100, such as a traction battery or battery modules or the like. The battery tray 102 may be generally between the front and rear wheels 104 of the vehicle 100 to distribute the battery weight and establish a low center of gravity for the vehicle. The vehicle for purposes of the disclosure may be any type of land motor vehicle, such as a car, truck, bus, van, sport utility vehicle, or the like, including those used for passenger travel, cargo shipping, or any other personal, governmental, or commercial purposes.

Figure 3:
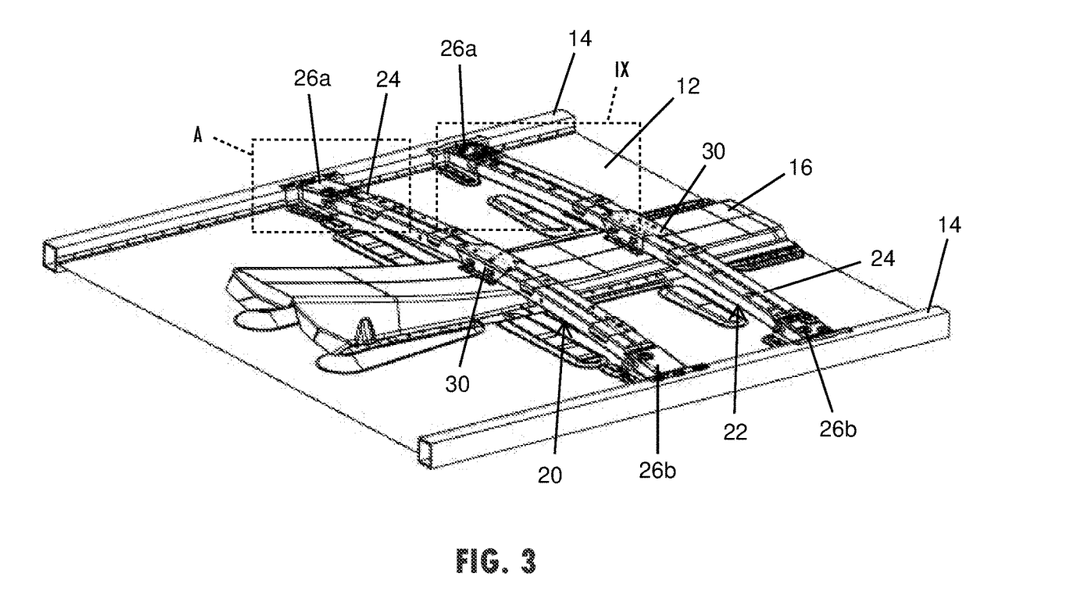
FIG. 3 is an upper perspective view of the floor assembly shown in FIG. 1.
Figure 3A:
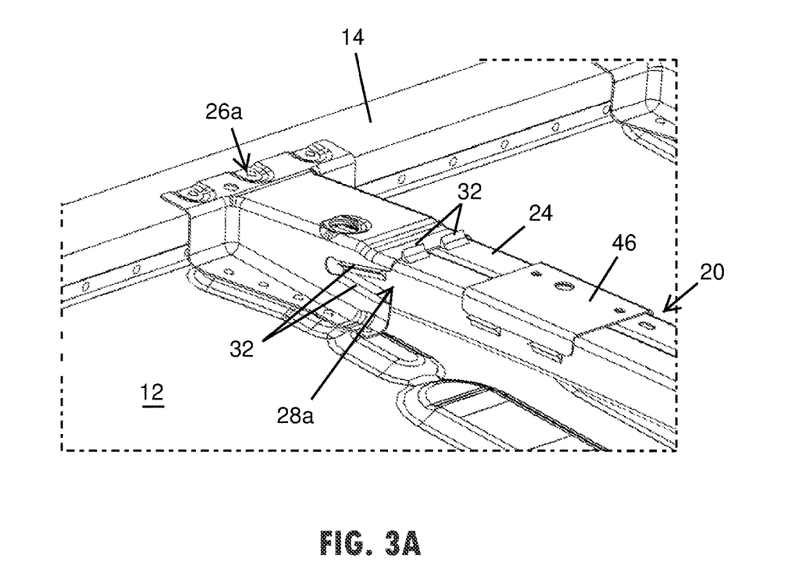
FIG. 3A is an enlarged perspective view of an end section of a crossmember and a mounting bracket taken at section A shown in FIG. 3.

The vehicle having the floor assembly 10 disclosed herein includes a lateral crossmember arrangement, such as shown in FIGS. 1-20 with two crossmembers 20, 22. It is contemplated that in additional examples, a single crossmember or additional crossmember or crossmembers may be provided, with our without straight crossmembers not having a curved section as described herein. The crossmembers 20, 22 each include a beam 24 that has a cross-sectional shape that extends continuously along the length of the beam, such as a roll formed beam or other types of beam that a generally consistent cross-sectional shape along its length. A curved shape is disposed along at least a section of each of the tubular beams 24 to provide a curve or arc shape that elevates the curved shape to span over a raised obstruction on the floor panel, such as a central tunnel 16 as shown in FIG. 3. The crossmembers 20, 22 couple to and span between the longitudinal members 14, such as to define a lateral load path between the longitudinal members 14 for transmitting laterally inboard impact loads or forces over the central tunnel 16. The longitudinal members 14 are shown as exemplary structural beams, which may be implemented as sills, door sills, rocker panels, rocker sections, or other longitudinal frame components or portions thereof.

Figure 7:
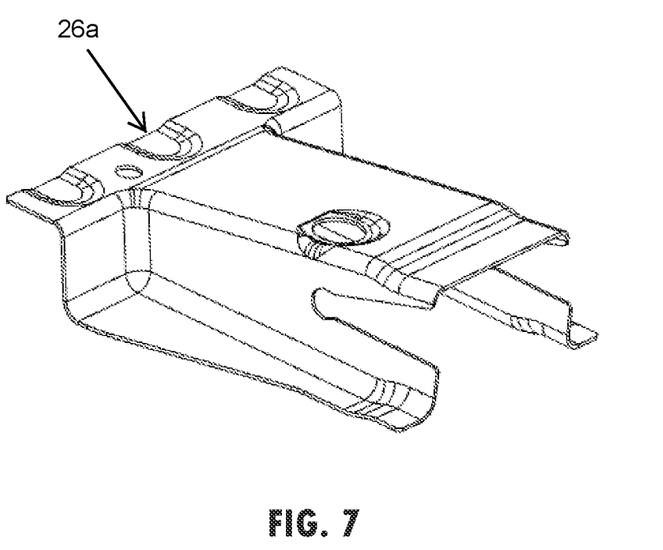
FIG. 7 is an upper perspective view of the end bracket shown in FIG. 5.
Figure 8:
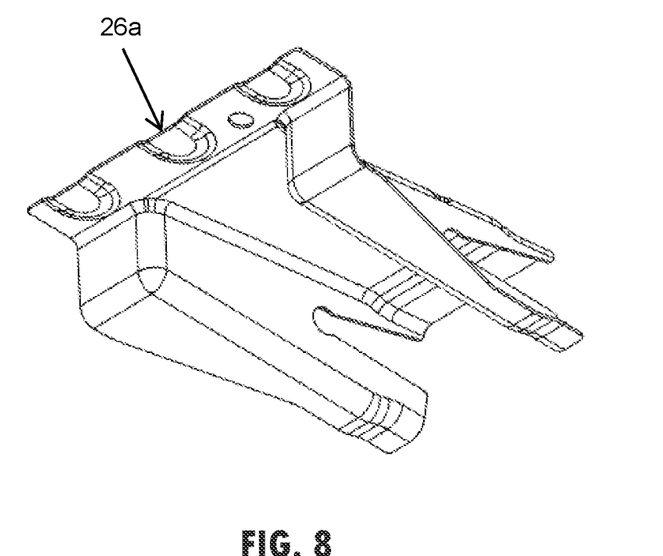
FIG. 8 is a lower perspective view of the end bracket shown in FIG. 7.
Figure 9:
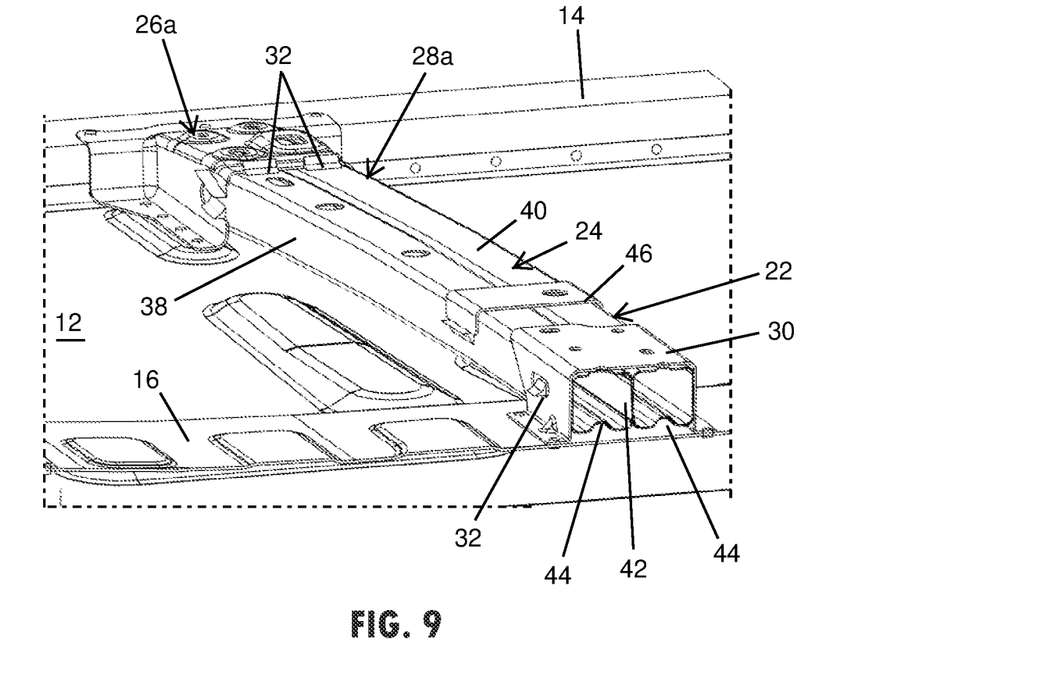
FIG. 9 is a cross-sectional perspective view of the floor assembly taken at section IX shown in FIG. 3.

The crossmembers 20, 22 may couple with the longitudinal members directly or indirectly, such as with the use of direct welding, adhesive, fasteners, and/or brackets or the like. The crossmembers 20, 22 show in FIGS. 1-14 include, a pair of mounting brackets 26a, 26b that are attached between the opposing ends 28a, 28b of a tubular beam 24 and inboard surfaces of the pair of longitudinal members 14. In one example, as shown in FIGS. 7 and 8, the mounting bracket 26a may include cut outs to allow for welding the sidewalls of the crossmember to the bracket. Also, a central mounting bracket 30 may be disposed over the central section of the tubular beam 24 and coupled to the central tunnel 16. At the central mounting bracket 30, the tubular beam 24 may be spaced from the central tunnel, such as to prevent indirect axial load transmission to the central tunnel from the beam. The end and central mounting brackets 28a, 28b, 30 each include a hat-shaped section having a C-shape portion that extends over the exposed upper and side surfaces of the tubular beam 24. Also, the end and central mounting brackets 28a, 28b, 30 have flanges 31 that are attached to the respective interfacing surfaces of the floor panel 12, longitudinal members 14, and central tunnel 16, such as with the use of welds 32 at the edges or overlapping portions (FIG. 9). As shown in FIGS. 11-14, the central mounting bracket 30 has vertically offset flanges 31a, 31b that are used to attached to a ramped upper surface 17 of the central tunnel 16, such as shown in FIG. 12. Additionally or alternatively, the end and central mounting brackets may be attached with the use of adhesive and/or fasteners or other attachment features. Also, the brackets may be formed or stamped with different shapes for configurations, such as L-shaped brackets that do not span over the tubular member of the crossmember.

Figure 4:
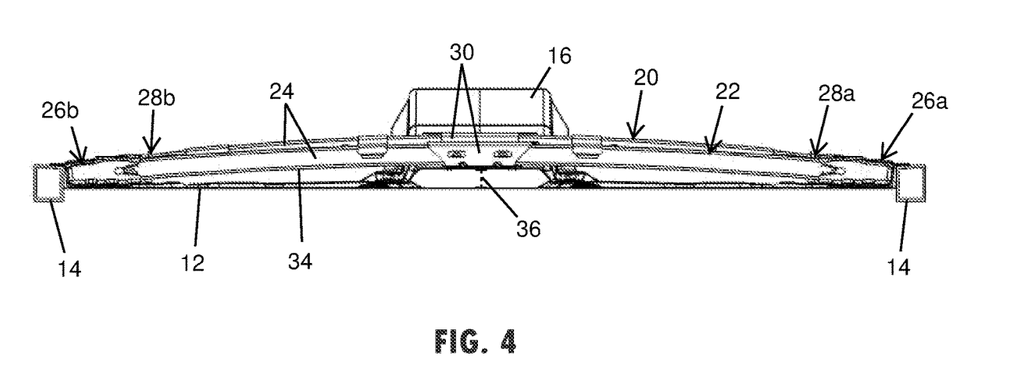
FIG. 4 is a rear elevation view of the floor assembly.
Figure 4A:
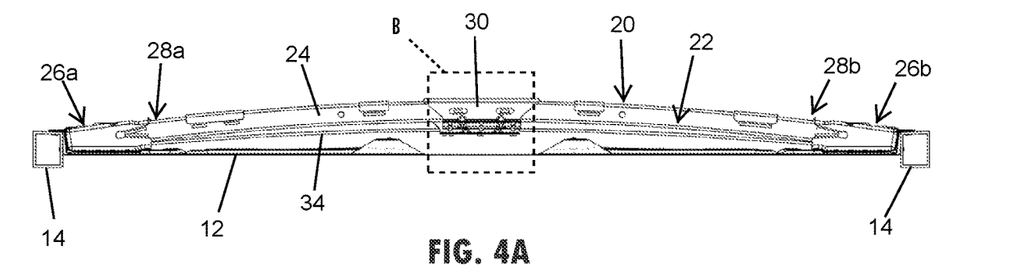
FIG. 4A is a front elevation view of the floor assembly omitting a tunnel.
Figure 4B:
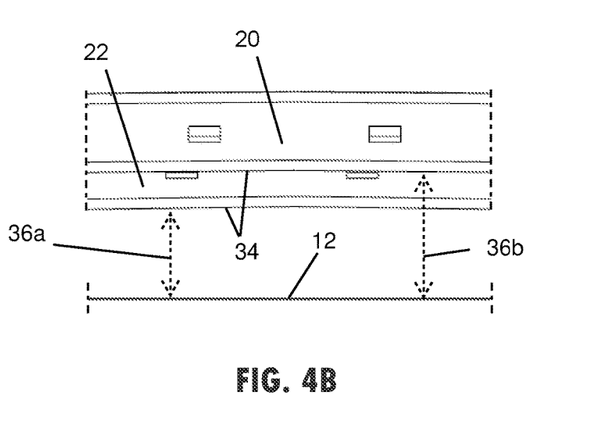
FIG. 4B is an enlarged front elevation view of the crossmembers and the floor panel taken at section B shown in FIG. 4A, omitting top brackets.
Figure 5:
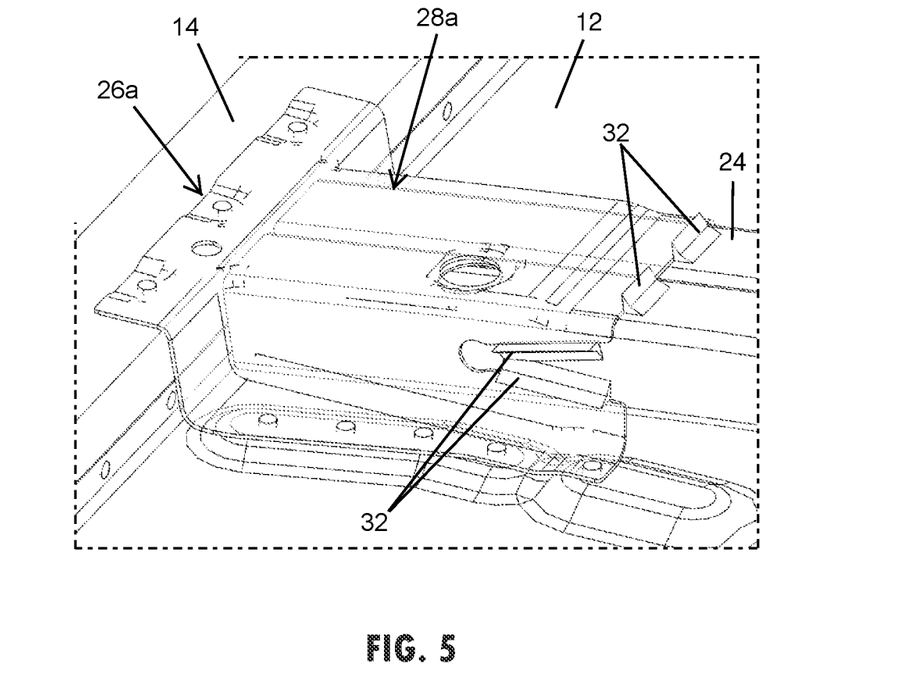
FIG. 5 is an enlarged perspective view of the end section of the crossmember and the mounting bracket of FIG. 3A with the mounting bracket shown partially transparent.
Figure 6:
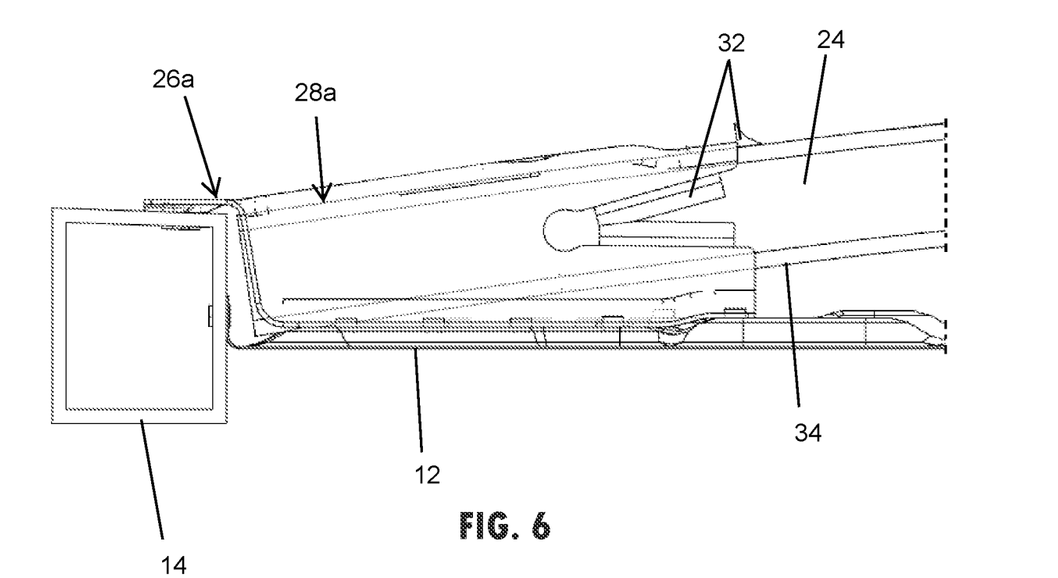
FIG. 6 is a front elevation view of the end section of the crossmember and the partially transparent mounting bracket shown in FIG. 5.

As shown in FIGS. 3 and 4, a bottom surface 34 of the tubular beam 24 extends along the length and is elevated a clearance distance 36 at the central section of the tubular beam 24 relative to the opposing ends 28a, 28b of the tubular beam 24. The tubular beam 24 has an upward swept curvature, providing a downward-facing concave surface and an upward-facing convex surface. The degree of the curvature of the tubular beam 24 shown in FIGS. 2-12 is constant along the length of the beam. In additional examples, such as shown in FIGS. 15-20, the curvature may increase at the central section, such that the radius of curvature decreases at the central section, to provide a more pronounced curvature to span over the central tunnel. As shown in FIG. 3, the clearance distance 36 provided by the curvature of the beam 24 is configured to span over the central tunnel 16, such that the distance may be at least a half of a vertical thickness of the tubular beam 24 or at least the equal to the vertical thickness of the tubular beam 24, such as at least 20 mm or at least 35 mm. As further shown in FIGS. 4-4B, the swept crossmembers 20, 22 may have different radius of curvature or different clearance distances 36a, 36b, such to span over the central tunnel 16 at different longitudinal location that have varied heights. As shown in the example in FIGS. 1-12, the central tunnel 16 has an increasing height toward the front portion of the vehicle 100. As such the tubular beam 24 of the forward swept crossmember 20 has a smaller radius of curvature (and resulting greater clearance distance or height) than the tubular beam 24 of the rearward swept crossmember 22.

The tubular beams 24 may each be formed as a unitary piece from a metal sheet that is bent or otherwise deformed, such as via roll forming or progressive stamping, to have at least one closed tubular section extending along the length of the tubular beam 24. For example, as shown in FIG. 9 the tubular beams 24 each have a pair of adjacent tubular members 38, 40 that have hollow openings that are divided by a common center wall 42 of the tubular beam. The pair of adjacent tubular members 38, 40 are disposed laterally adjacent (side-by-side) to each when spanning across the vehicle floor 12. To increase the longitudinal stiffness of the tubular beam 24 along its length, stiffening channels 44 may be formed along a portion of the beam, such as along the bottom wall or surface 24 of each of the tubular members 38, 40. The stiffening channels 44 protrude into an interior volume of each tubular member 38, 40 and function to stiffen the bottom wall or surface and prevent buckling.

Figure 10:
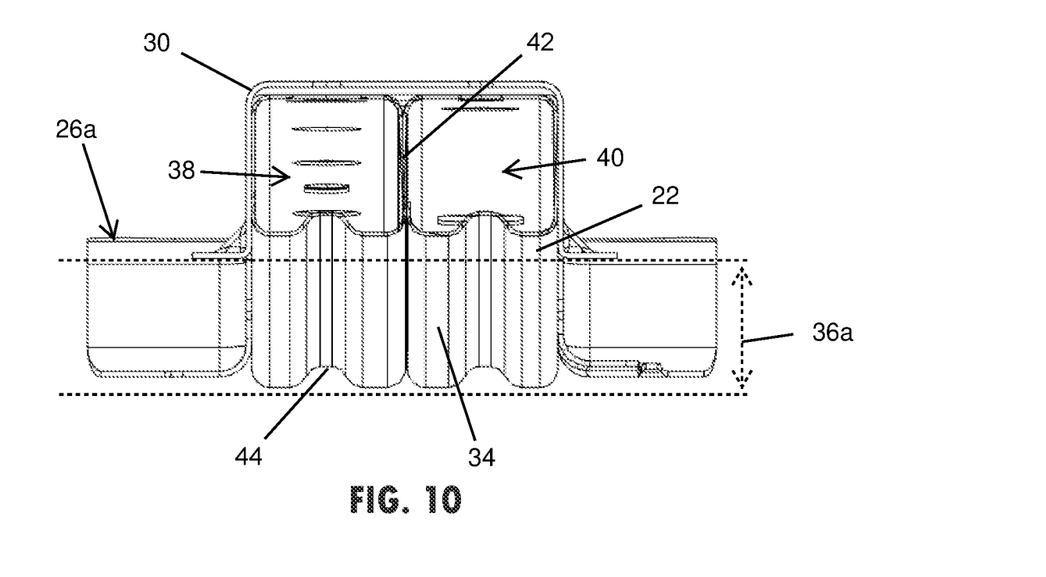
FIG. 10 is a cross-sectional side view of the crossmember and the mounting bracket shown in FIG. 9.

As shown in FIGS. 9, 10, and 12, the cross-sectional shape of the tubular beam 24 is made by the outer sections of the metal sheet that form the two adjacent tubular portions 38, 40 extend from opposing sides of a center section of the metal sheet that forms the common center wall 42 of the beam. Once the beam 24 is formed, the two adjacent tubular portions 38, 40 of the beam 24 are defined by bottom walls, top walls, a front wall, and a rear wall. The bottom walls of the adjacent tubular portions 38, 40 are substantially aligned with each other so as to form a downward facing surface 34 of the beam. The bottom walls each include the stiffening channel 44 that is about 8 mm to 10 mm deep and 8 mm to 10 mm wide, where the beam 24 is about 80 mm wide and 40 mm thick. The top walls are also in alignment with each other and are substantially parallel with the bottom walls. Further, the front and rear walls are substantially parallel with each other and the center wall 42 and generally perpendicular with the bottom and top walls. The radius of curvature at the corners between the walls of the beam 24 is between 3-4 mm, but may be greater in additional implementations, such as for sheet stock with a greater thickness. It is understood that additional examples of the beam may assume various shapes and orientations from that shown in FIG. 3 and may include alternative dimensional proportions. In other examples, the tubular beam may be similarly formed with more or fewer tubular members, stiffening channels, or other cross-sectional geometrical shapes. The tubular beam of the swept crossmember may also be designed with a different cross-sectional shape to support and sustain different axial loading conditions. For instance, the cross-sectional shape may include tubular shapes that do not share a common wall (such as a B-section), a single tubular shape (such as a D-section), or an open channel shape (such as a C-section).

The tubular beam 24 of the swept crossmember may be manufactured by roll forming a high-strength steel sheet, such as by uncoiling the sheet from a roll of sheet stock and roll forming the sheet to have a desired cross-sectional shape for efficiently absorbing impact energy, while minimizing the weight of the beam. The sheet may be continuously welded in the roll forming operation, such as via laser welding, to fix the formed sheet in the formed cross-sectional shape, such as with the closed tubular members 38, 40. The beam 24 may be made from a sheet of steel material having a thickness of 0.8 mm to 1.4 mm or approximately between 1 mm and 1.5 mm. Also, the sheet may have a tensile strength of about 800 to 2000 MPa (i.e. about 120 to 290 ksi), such as at least 980 MPa or at least 1,500 MPa. In additional implementations the reinforcement beam can be made of different materials, including AHSS (Advanced High Strength Steels) and it can be made from a sheet having a thickness of about 0.8 mm to 3.0 mm thick. Alternatively, the metal sheet may be a high strength aluminum sheet.

In further implementations, the material of the swept crossmember may be an aluminum extrusion or a polymer composite pultrusion. The cross-sectional geometry, material type, and material thickness within the cross-sectional profile of the tubular beam of the swept crossmember may be configured for such a particular use and the desired loading and performance characteristics of the beam, such as the beam weight, the load capacity of the beam, force deflection performance of the beam, and impact performance of the beam, and the like.

Figure 11:
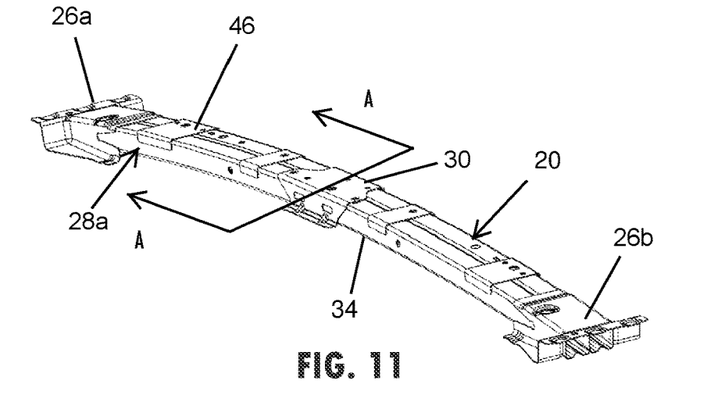
FIG. 11 is an upper perspective view of the crossmember and the mounting bracket shown in FIG. 4A
Figure 11A:
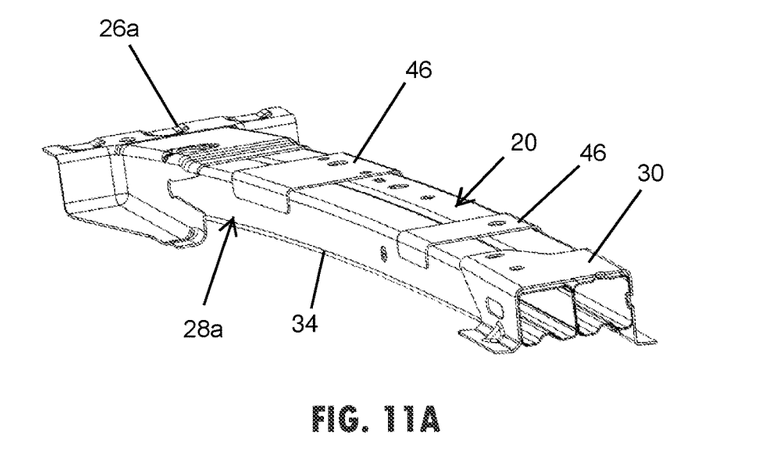
FIG. 11A is a cross-sectional perspective view of the crossmember and the mounting bracket taken at line A-A shown in FIG. 11.
Figure 12:
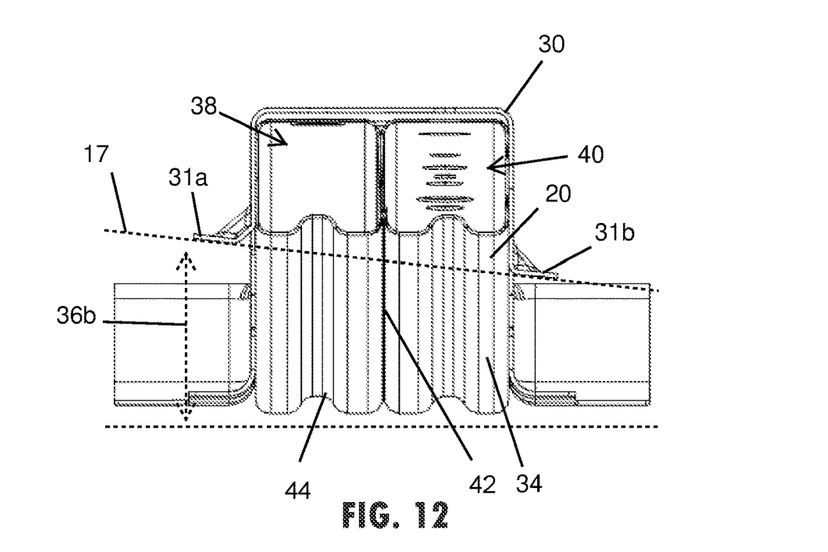
FIG. 12 is a cross-sectional side view of the crossmember and the mounting bracket shown in FIG. 11A.
Figure 13:
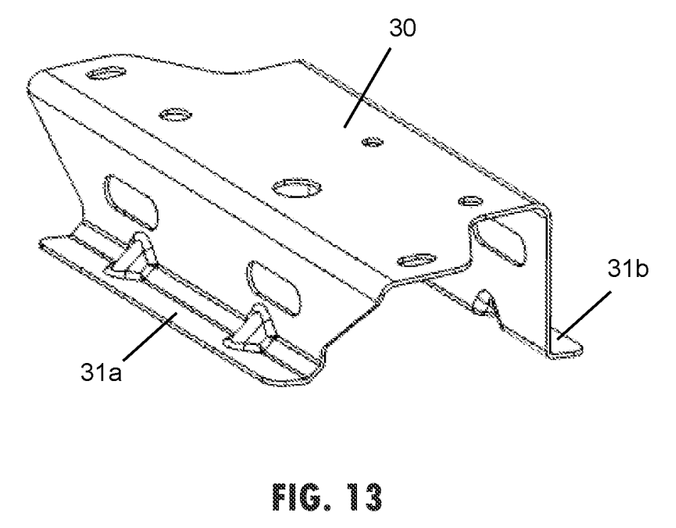
FIG. 13 is an upper perspective view of the top bracket shown in FIG. 11.
Figure 14:
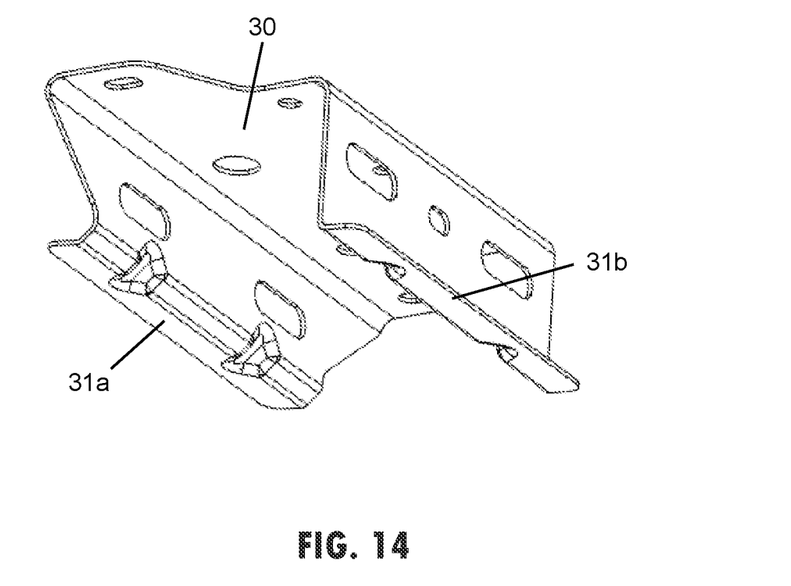
FIG. 14 is a lower perspective view of the top bracket shown in FIG. 11.

As further shown in FIGS. 11 and 11A, the swept crossmembers 20, 22 may include top brackets 46 that span longitudinally over the top surface of the beam 24, such as to provide a mounting location for other vehicle components or sub-assemblies. The top brackets 46 shown in FIGS. 11 and 11A have a have C-shaped cross-sections and openings at the top portion for such attachments. Also, the beam 24 may include holes or attachment features (e.g., SPAC nuts, riv nuts, or the like) at selection locations on the top walls to provide similar attachment locations.

Figure 15:
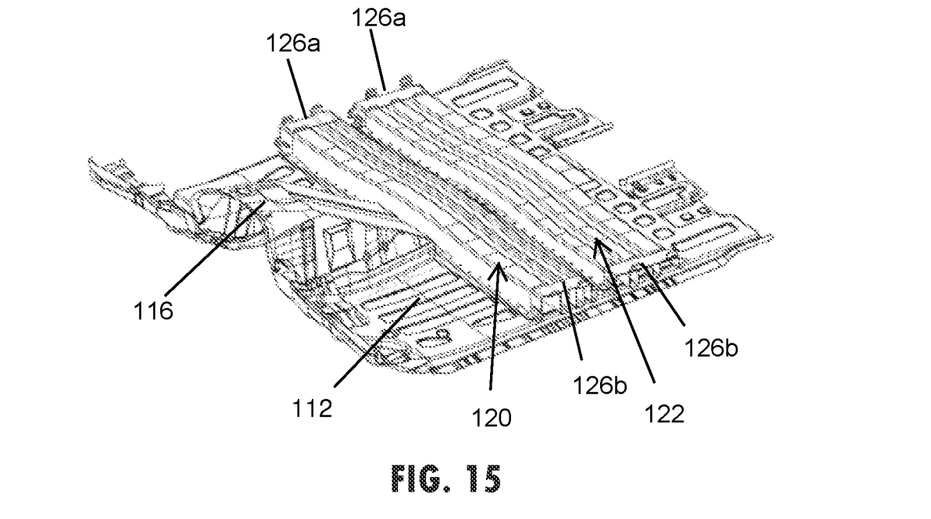
FIG. 15 is an upper perspective view of a floor assembly.
Figure 16:
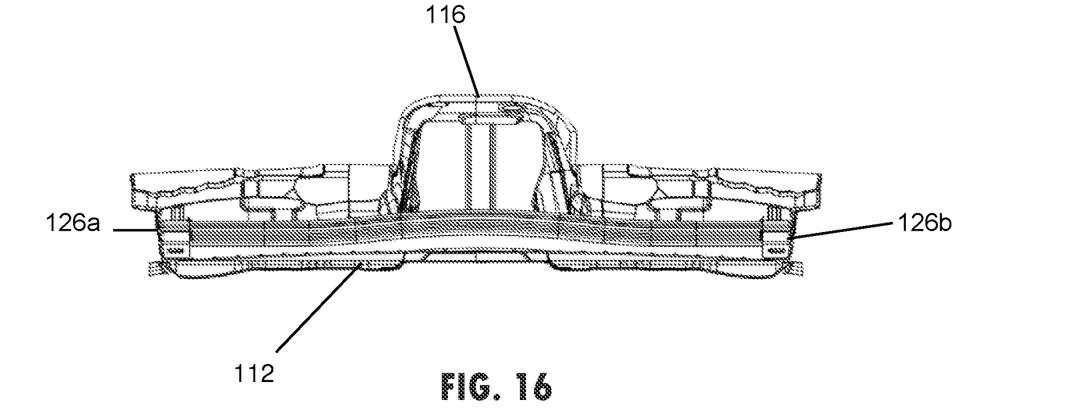
FIG. 16 is a rear elevation view of the floor assembly of FIG. 15.
Figure 17:
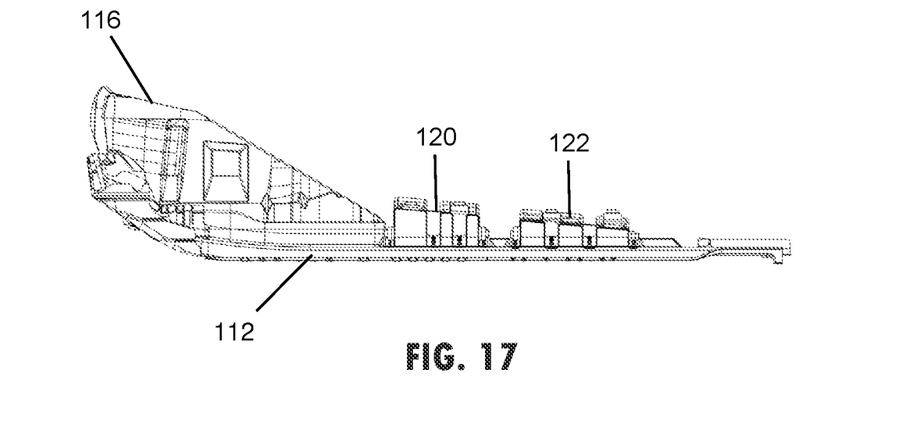
FIG. 17 is a side elevation view of the floor assembly of FIG. 15.

Moreover, another example of a floor assembly 110 is shown in FIGS. 15-20 with two crossmembers 120, 122. The crossmembers 120, 122 each include a beam 124 that has a cross-sectional shape that extends continuously along the length of the beam, such as a roll formed beam or other types of beam that a generally consistent cross-sectional shape along its length. A curved shape is disposed along at least a section of each of the tubular beams 124 to provide a curve or arc shape that elevates the curved shape to span over a raised obstruction on the floor panel, such as a central tunnel 116 as shown in FIG. 16. The crossmembers 120, 122 couple to and span between longitudinal members along sides of the floor panel 112, such as to define a lateral load path between the longitudinal members for transmitting laterally inboard impact loads or forces over the central tunnel 116. The longitudinal members may be implemented as sills, door sills, rocker panels, rocker sections, or other longitudinal frame components or portions thereof.

The crossmembers 120, 122, may couple with the longitudinal members directly or indirectly, such as with the use of direct welding, adhesive, fasteners, and/or brackets or the like. As shown in FIG. 15, a pair of mounting brackets 126a, 126b are attached between the opposing ends 128a, 128b of the crossmember beams 124 to attach at inboard surfaces of longitudinal members. Also, additional mounting brackets may be disposed at different locations to secure the crossmember beams to the floor panel, central tunnel, or other structure component.

Figure 18:
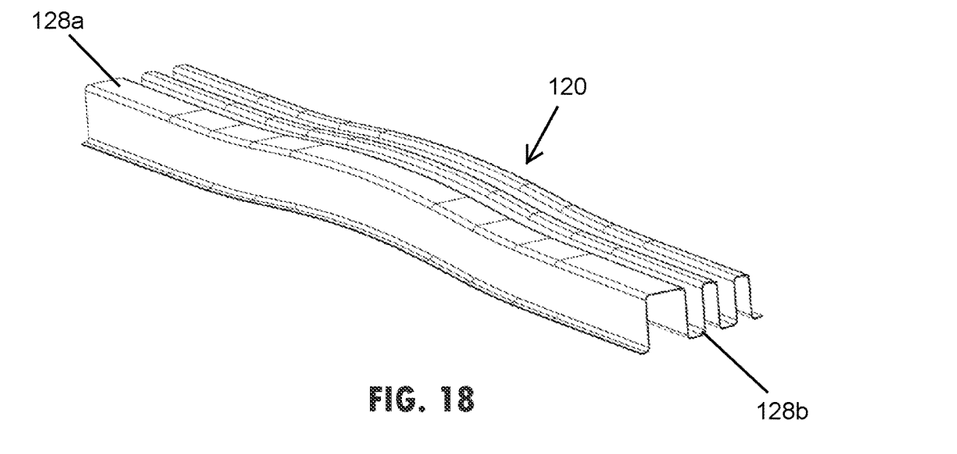
FIG. 18 is an upper perspective view of a crossmember shown in FIG. 15.
Figure 19:
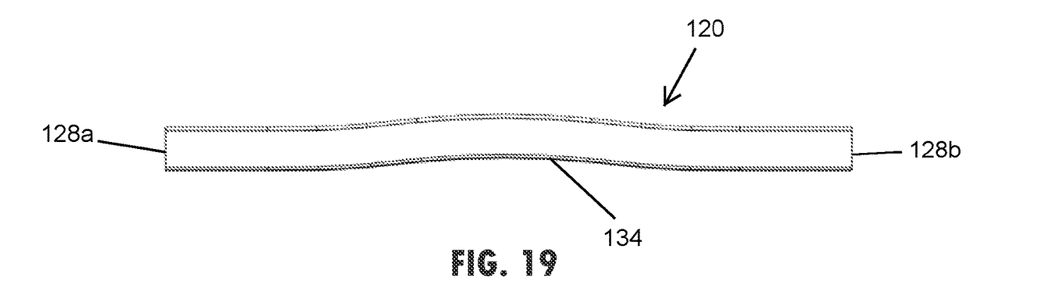
FIG. 19 is a front elevation view of the crossmember of FIG. 18.
Figure 20:
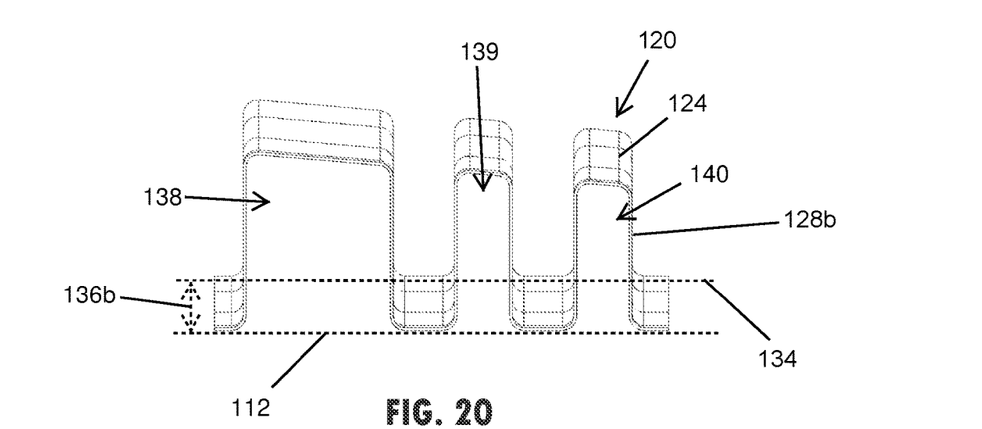
FIG. 20 is a side elevation view of the crossmember of FIG. 18.

As shown in FIG. 20, a bottom surface 134 of the crossmember beam 124 extends along the length and is elevated a clearance distance 136b at the central section of the crossmember beam 124 relative to the opposing ends 128a, 128b of the crossmember beam 124. The crossmember beam 124 has an upward swept curvature at the central section of the beam 124, providing a downward-facing concave surface 134 and an upward-facing convex surface. The degree of the curvature of the crossmember beam 134 shown in FIGS. 18-20 is largest at the central section and generally straight at the end sections, such that the radius of curvature decreases at the central section, to provide a more pronounced curvature to span over the central tunnel. As shown in FIG. 20, the clearance distance 136b provided by the curvature of the beam 124 is configured to span over the central tunnel 116, such that the distance may be at least a half of a vertical thickness of the tubular beam 124 or at least the equal to the vertical thickness of the tubular beam 124, such as at least 20 mm or at least 35 mm. As further shown in FIG. 17, the swept crossmembers 120, 122 have different radius of curvature or different clearance distances, such to span over the central tunnel 116 at different longitudinal location that have varied heights. As shown in the example in FIGS. 15-17, the central tunnel 116 has an increasing height toward the front portion of the vehicle. As such the crossmember beam 124 of the forward crossmember 120 has a smaller radius of curvature (and resulting greater clearance distance or height) than the crossmember beam 124 of the rearward swept crossmember 122.

The tubular beams 124 shown in FIGS. 15-20 each are formed as a unitary piece from a metal sheet that is bent or otherwise deformed, such as via roll forming or progressive stamping, to have an open section, void of any enclosures, extending along the length of the crossmember beam 124. For example, as shown in FIG. 20, the crossmember beams 124 has three separate longitudinal protrusions that raise vertically from the floor panel 112. At least at the ends of the crossmember beam 124, the lower surface 134 of the beam 124 attach to the floor panel 112 to enclose tubular section 138, 139, 140 that have hollow openings that are divided by spacing formed by the lower surface 134 of the crossmember beam.

The crossmember beam 124 of the swept crossmember may be manufactured by roll forming a high-strength steel sheet, such as by uncoiling the sheet from a roll of sheet stock and roll forming the sheet to have a desired cross-sectional shape for efficiently absorbing impact energy, while minimizing the weight of the beam. The beam 24 may be made from a sheet of steel material having a thickness of 0.8 mm to 1.4 mm or approximately between 1 mm and 1.5 mm. Also, the sheet may have a tensile strength of about 800 to 2000 MPa (i.e. about 120 to 290 ksi), such as at least 980 MPa or at least 1,500 MPa. In additional implementations the reinforcement beam can be made of different materials, including AHSS (Advanced High Strength Steels) and it can be made from a sheet having a thickness of about 0.8 mm to 3.0 mm thick. Alternatively, the metal sheet may be a high strength aluminum sheet.

In further implementations, the material of the crossmember may be an aluminum extrusion or a polymer composite pultrusion. The cross-sectional geometry, material type, and material thickness within the cross-sectional profile of the tubular beam of the swept crossmember may be configured for such a particular use and the desired loading and performance characteristics of the beam, such as the beam weight, the load capacity of the beam, force deflection performance of the beam, and impact performance of the beam, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Also for purposes of this disclosure, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle floor assembly comprising:
   a floor panel;
   a pair of elongated members disposed along opposing sides of the floor panel;
   a central tunnel extending longitudinally between the pair of elongated members and having an upper surface elevated vertically from a planar extent of the floor panel; and
   a crossmember beam coupled to and spanning between the pair of longitudinal members,
   wherein the crossmember beam comprises a cross-sectional shape defined by top walls and bottom walls extending continuously along a length of the crossmember beam, and
   wherein the crossmember beam includes a curved shape along at least a section of the length of the crossmember beam that positions a lower surface of the crossmember beam above and spaced from the upper surface of the central tunnel.

2. The vehicle floor assembly of claim 1, wherein the lower surface of the crossmember beam is elevated a clearance distance at a central section of the crossmember beam relative to the lower surface at ends of the crossmember beam.

3. The vehicle floor assembly of claim 2, wherein the clearance distance is at least a half of a vertical thickness of the crossmember beam and configured to span over the central tunnel that extends longitudinally along the floor panel.

4. The vehicle floor assembly of claim 1, further comprising a pair of mounting brackets attached between ends of the crossmember beam and inboard surfaces of the pair of elongated members.

5. The vehicle floor assembly of claim 1, wherein the crossmember beam comprises a metal sheet formed to have at least one tubular section extending along the length of the crossmember beam.

6. The vehicle floor assembly of claim 1, wherein the metal sheet comprises a martensitic steel with a tensile strength of at least 980 MPa.

7. The vehicle floor assembly of claim 1, wherein the crossmember beam defines a lateral load path between the pair of elongated members for transmitting laterally inboard impact forces over the central tunnel.

8. The vehicle floor assembly of claim 1, wherein the crossmember beam comprises a metal sheet formed to have a pair of adjacent tubular members that have hollow openings divided by a common center wall of the crossmember beam.

9. The vehicle floor assembly of claim 8, wherein the pair of adjacent tubular members are disposed laterally adjacent to each other and together span across the floor panel.

10. The vehicle floor assembly of claim 9, further comprising a second crossmember beam coupled and spanning between the pair of longitudinal members at a longitudinally spaced distance from the crossmember beam, wherein the second crossmember beam comprises a second curved shape along at least a section of the length of the second crossmember beam, and wherein the second curved shape has a smaller radius of curvature than the first swept shape to span over the central tunnel at a greater vertical clearance distance.

11. A vehicle floor assembly comprising:
    a floor panel;
    a raised obstruction disposed at a central portion the floor panel between opposing longitudinal sides of the floor panel, the raised obstruction having an upper surface elevated vertically relative to the opposing longitudinal sides of the floor panel; and
    a crossmember beam comprising a length spanning laterally over the floor panel between the opposing longitudinal sides of the floor panel,
    wherein the crossmember beam comprises a cross-sectional shape extending continuously along the length of the crossmember beam,
    wherein the crossmember beam includes a curved shape along at least a central section of the length of the crossmember beam that positions a lower surface of the crossmember beam above the upper surface of the raised obstruction, and
    wherein an upper surface of the crossmember beam and the lower surface of the crossmember beam are substantially parallel along the length of the beam.

12. The vehicle floor assembly of claim 11, wherein the lower surface of the crossmember beam is elevated a clearance distance at the central section of the crossmember beam relative to the lower surface at ends of the crossmember beam.

13. The vehicle floor assembly of claim 12, wherein the clearance distance is at least a half of a vertical thickness of the crossmember beam and is configured to span over the raised obstruction that extends longitudinally along the floor panel.

14. The vehicle floor assembly of claim 11, further comprising
    a pair of elongated members disposed along opposing sides of the floor panel; and
    a pair of mounting brackets attached between ends of the crossmember beam and inboard surfaces of the pair of elongated members.

15. The vehicle floor assembly of claim 14, further comprising a second crossmember beam coupled and spanning between the pair of longitudinal members at a longitudinally spaced distance from the crossmember beam, wherein the second crossmember beam comprises a second curved shape along at least a section of the length of the second crossmember beam, and wherein the second curved shape has a smaller radius of curvature than the first swept shape to span over the central tunnel at a greater vertical clearance distance.

16. The vehicle floor assembly of claim 11, wherein the crossmember beam comprises a metal sheet formed to have at least one closed-tubular section extending along the length of the crossmember beam.

17. The vehicle floor assembly of claim 11, wherein the metal sheet comprises a martensitic steel with a tensile strength of at least 980 MPa.

18. The vehicle floor assembly of claim 14, wherein the crossmember beam defines a lateral load path between the pair of elongated members for transmitting laterally inboard impact forces over the central tunnel.

19. A swept crossmember for a vehicle floor, the swept crossmember comprising:
- a beam comprising a length configured to span laterally over a floor panel and comprising a cross-sectional shape extending continuously along the length of the beam,
- wherein the beam includes a curved shape along at least a central section of the length of the beam that positions a lower surface of the crossmember beam above and spaced from an upper surface of a raised obstruction protruding from the floor panel; and
- a pair of mounting brackets coupled to opposing ends of the tubular beam and configured to mount at longitudinal members that span along sides of the floor panel.

20. The swept crossmember of claim 19, wherein the tubular beam comprises a metal sheet formed to have at least one tubular section extending along the length of the tubular beam, the metal sheet comprising a martensitic steel with a tensile strength of at least 980 MPa.

* * * * *